United States Patent [19]
Ritch et al.

[11] 3,880,700
[45] Apr. 29, 1975

[54] APPARATUS FOR APPLYING HANDLES TO PLASTIC BAGS

[75] Inventors: Avron Ritch; John Andrew Holub; Frederick Arnold Mattis, all of Edmonton, Alberta, Canada

[73] Assignee: MacKenzie Trading Co. Ltd., Edmonton, Alberta, Canada

[22] Filed: June 28, 1973

[21] Appl. No.: 374,575

[30] Foreign Application Priority Data
May 15, 1973 Canada ................................. 171585

[52] U.S. Cl................................ 156/514; 93/35 H
[51] Int. Cl......................... B32b 31/00; B31b 1/86
[58] Field of Search ........... 156/252, 253, 510, 513, 156/514; 93/35 H

[56] References Cited
UNITED STATES PATENTS
3,069,303  12/1962  Scholle ............................... 156/253
3,440,124  4/1969  Schwarzkopf ...................... 156/513

Primary Examiner—Douglas J. Drummond

[57] ABSTRACT

Apparatus for applying plastic handles to tubular plastic bag stock and including a combination cutting and welding mechanism which penetrates the bag stock and welds handles to sides of the bag stock while the bag stock is stationary. This mechanism includes a float piece which is restrained to remain in a predetermined position as the bag stock is fed over the float piece by the drive mechanism and a handle transport mechanism feeds pairs of handles to respective positions at either side of the float piece adjacent respective sides of the bag stock. The combination cutting and welding mechanism includes a double-acting head having a cutter which penetrates the bag stock and a pressure plate which applies a compressive pressure to compress the handles against the bag sides which are heated by platens forming parts of the float piece. The platens are heated electrically when the cutter penetrates the bag stock.

10 Claims, 7 Drawing Figures

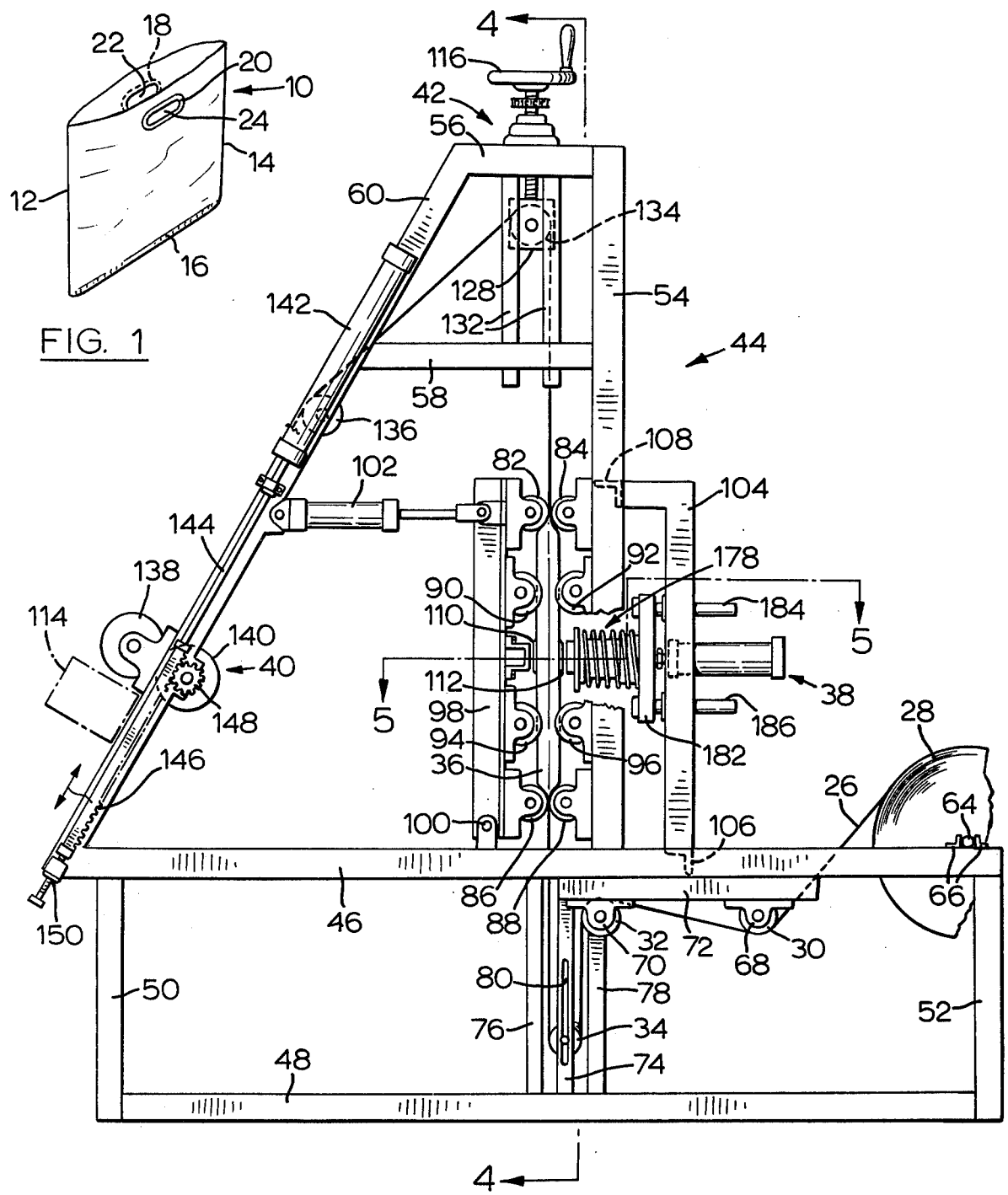

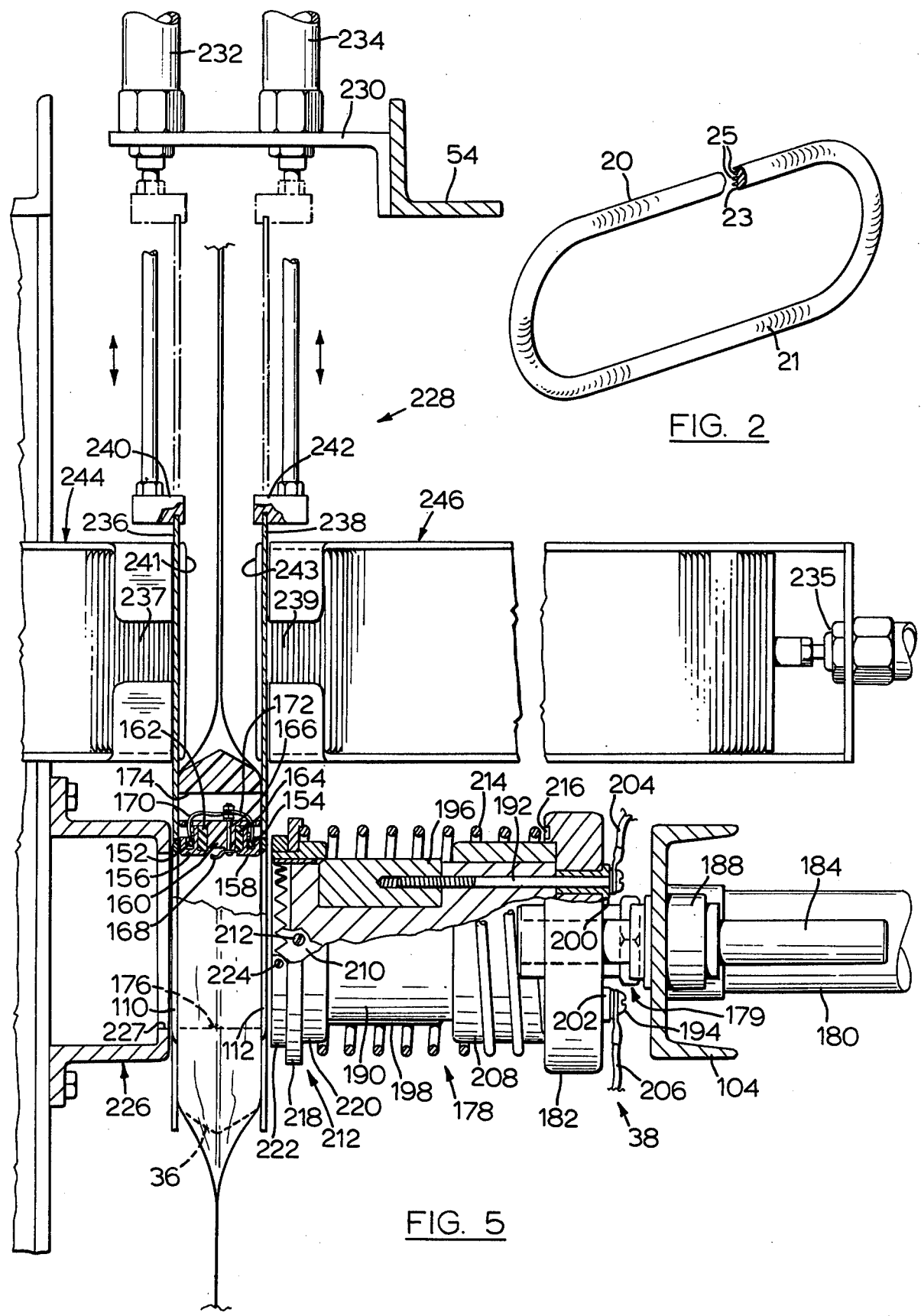

APPARATUS FOR APPLYING HANDLES TO PLASTIC BAGS

This invention relates to apparatus for making plastic bags from tubular bag stock, each of the plastic bags having a pair of handles attached one to each side of the bag and surrounding respective openings in the sides of the bag.

Plastic bags are commonly made by first preparing tubular bag stock which is then sealed and severed at intervals corresponding to a bag length. The seal forms a bottom of a bag and the severing operation takes place adjacent the seal to define the open top of the next bag coming off the bag stock. In many instances it is preferable to have handles of some sort on the bag so that the bag can be used as a carrier for articles. An advantage of such a structure is that it can be used for advertising. When a purchaser buys an item from a store, he is given such a bag having advertising material on the side which is displayed by the purchaser in carrying the bag.

Various types of handles have been used with plastic bags. However, in many instances difficulties have arisen in production because considerations of appearance demand that the handles be welded on the outside surfaces of the bag sides. The handles are relatively thick when compared with the bag sides so that the welding must be done from inside the bag to achieve proper heat penetration. Presently, a large number of carrier bags are manufactured by first making a simple bag and then adding the handles in a manual welding operation.

One type of handle which has proven satisfactory is a peripheral handle which is welded about an opening or grip hole in a bag side. This opening must be made either before or after attaching the handle and it will be evident that because of the flimsy nature of the bag material, it is not a simple matter to prepare such an opening.

An example of apparatus designed to make bags having handles disposed about an opening or grip hole is shown in U.S. Pat. No. 3,440,124 to Schwartzkkopf. This apparatus first punches grip holes in bag stock and then transports the bag stock to a location in which peripheral handles are applied about the grip holes. The handles are supplied to this location in strip form and must be severed from the strip when the handles are attached to the bag stock. The location of the grip holes relative to the handles is necessarily critical in order to ensure that the grip hole is properly surrounded by a handle. The Schwartzkopf apparatus therefore suffers from two disadvantages. Firstly, the grip hole once formed must then be located for receiving handles, and secondly the handles must be supplied initially in strip form and then severed without damaging the bag stock.

It is an object of the present invention to provide apparatus for manufacturing plastic bags having handles surrounding openings or grip holes in the bag, which apparatus forms the openings and applies the handles in a combined operation.

It is also an object of the invention to provide apparatus for manufacturing plastic bags having handles in which the apparatus transports the handles individually before attaching the handles to the bag stock.

Accordingly, in one of its aspects, the present invention provides apparatus for applying plastic handles to tubular plastic bag stock. The apparatus includes a drive mechanism which is adapted to feed the bag stock through the apparatus intermittently in bag lengths. A combination cutting and welding mechanism penetrates the bag stock and welds handles to sides of the bag stock while the stock is stationary. This mechanism includes a float piece which is restrained to remain in a predetermined position as the bag stock is fed over the float piece by the drive mechanism and a handle transport mechanism feeds pairs of handles to respective positions at either side of the float piece adjacent respective sides of the bag stock. The combination cutting and welding mechanism includes a double-acting head having a cutter which penetrates the bag stock and a pressure plate which applies a compressive pressure to compress the handles against the bag sides which are heated by platens forming parts of the float piece. The platens are heated electrically when the cutter penetrates the bag stock.

This and other aspects of the invention will be better understood with reference to the drawings, in which:

FIG. 1 is a perspective view of a typical bag made by apparatus according to the invention;

FIG. 2 is a perspective view of a handle used on the bag with a part of the handle broken away to indicate a cross-section of the handle;

FIG. 3 is a side view of apparatus according to the invention for making bags such as that illustrated in FIG. 1;

FIG. 5 is a sectional plan view on line 5—5 of FIG. 3 and showing a combined cutting and welding mechanism in a withdrawn position;

Figure 4:
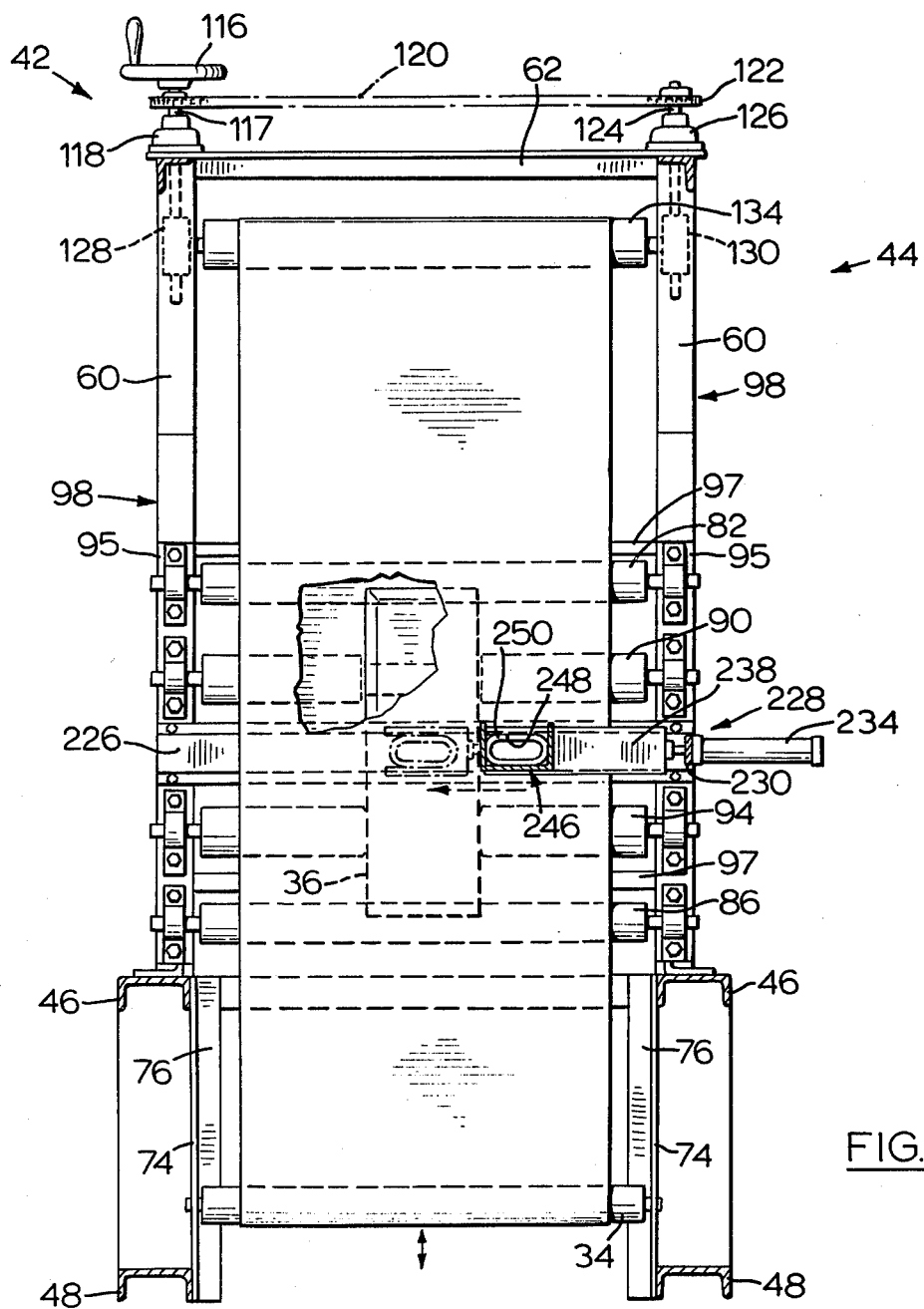
FIG. 4 is a sectional end view on line 4—4 of FIG. 3.

Reference is made first to FIG. 1 which shows a plastic bag 10 made by apparatus according to the invention. The bag is formed from tubular bag stock having creases defining longitudinal edges 12 and 14 and welded transversely at the bottom of the bag 16. A pair of plastic handles 18, 20 are welded to resective sides of the bag adjacent the open top of the bag and openings 22, 24 are formed in the walls of the bag within the confines of the handles 18, 20. These handles are attached to outer surfaces of the bag walls by welding from inside the bag. The form of the handles is illustrated in FIG. 2 which shows handle 20 which is typically generally oval and has a rounded outer surface 21 and a generally flat inner surface 23 from which small projections 25 depend for better attachment to the bag wall as will be explained.

Reference is now made to FIG. 3 which shows apparatus incorporating the invention for making the bag 10 shown in FIG. 1. Tubular bag stock 26 leaves the supply roll 28 and passes under and over respective first and second feed rollers 30, 32 before passing under a dancer roller 34. The feed stock then passes upwardly about a central float piece 36 which forms part of a combination cutting and welding mechanism 38 to both form openings corresponding to openings 22, 24 (FIG. 1) and to attach handles such as handles 18, 20 (FIG. 1). The bag stock is stationary while this operation takes place. Next the bag stock with handles attached is drawn upwardly by an intermittent drive mechanism 40 which draws the bag stock over an adjuster 42. This driver mechanism operates to move the bag stock through one bag length at a time to allow the mechanism 38 to be actuated to apply handles to the bag stock each time the bag stock is satisfactory. Each time the bag stock stops after passing through the drive mechanism 40, the bag stock is simultaneously cut to separate a finished bag and welded to form a weld such as weld 16 (FIG. 1) at the exposed end of the bag stock to thereby seal the bottom of the next bag.

Parts of the apparatus are attached to a support structure 44 which consists essentially of a pair of side frames interconnected by cross members. One of the side frames can be seen in FIG. 3 and this consists of upper and lower main members 46, 48 interconnected by end uprights 50, 52. A main upright 54 extends from adjacent the centre of member 46 and meets a top member 56 at its upper end. Upright 54 is also attached to an end of an intermediate member 58 and the members 56, 58 are attached at their other ends to an inclined member 60 which extends from the relatively short top member 56 to an end of the upper main member 46. It will be appreciated that each of the parts described with reference to the frame seen in FIG. 3 is duplicated on the other side of the frame so that each of these parts represents a pair of parts. It will be evident that other parts which are to be described also represent pairs of parts.

Transverse connecting members such as member 62 seen at the top of FIG. 4 are provided and spaced around the support structure to interconnect the side frames.

Reference is now made to those parts of the apparatus which are used to handle the bag stock 26. The supply roll 28 is mounted on a shaft 64 which is located relatively loosely between pairs of stops 66 at either side of the shaft 64. The feed rollers 30, 32 are journalled in respective pairs of bearing blocks 68, 70 mounted on spacer members 72 on the underside of the respective upper main members 46. Bag stock 26 leaves the second feed roller 32 and passes vertically downwards to dancer roller 34 before passing vertically upwards towards the float piece 36. As seen in FIGS. 3 and 4, the dancer roller 34 is mounted between a pair of upright elements 74 which extend vertically between respective pairs of the upper and lower main members 46, 48. Pairs of rigidifying outer elements 76, 78 also extend between the main members 46, 48 to further rigidify the support structure 44.

The upright elements 74 define vertically extending slots 80 to permit the dancer roller 34 to move vertically to thereby apply a relatively constant tension to the bag stock and to take up variations in the length of the bag stock between the mechanism 38 and the supply roll 28.

As seen in FIGS. 3 and 4, the central float piece 36 is located vertically by respective pairs of upper and lower rollers 82, 84 and 86, 88 and is located transversely by respective pairs of intermediate rollers 90, 92 and 94, 96. The shape of these locating rollers can be seen in FIG. 4 which shows one of each pair. The upper and lower rollers are cylindrical whereas the intermediate rollers have respective central portions of reduced diameter to define shoulders for locating sides of the float piece 26. The locating rollers are proportioned and positioned so that the float piece can move vertically and transversely within defined small limits so that as the bag stock passes over the float piece there is little likelihood of the bag stock causing the float piece to jam in the rollers.

The locating rollers shown in FIG. 4 are mounted on an adjustable roller carrier 98 which, as seen in FIG. 3, is coupled by pivots 100 to the respective upper main member 46. The roller carrier 98 has side members 95 interconnected by transverse braces 97 (FIG. 4) and is normally in a vertical position in use. However, the carrier can be rotated away from the bag stock, about pivots 100 by a pair of actuators 102 coupled at their ends to respective inclined members 60 and to carrier side members 98. Consequently, by energising actuators 102, it is possible to tilt the roller carrier 98 and associated rollers away from the bag stock for maintaining and setting up the apparatus as will be described. Rollers which correspond to those mounted on the carrier 98 are mounted on the main uprights 54 of the support structure 44.

As better seen in FIG. 3, the combination cutting and welding mechanism 38 is coupled to a central bracket 104 which extends vertically from a transverse connecting member 106 attached to upper main members 46. The upper end of bracket 104 is attached to transverse member 108 which extends between main uprights 54. The mechanism 38 together with a transport mechanism for positioning handles 110, 112 will be more fully described after completing the description of parts of the apparatus which are used to guide the bag stock. At this point it is sufficient to indicate that when the bag stock 26 leaves the central float piece 36, handles have been attached by the mechanism 38 at intervals corresponding to bag lengths.

On leaving central float piece 36, the bag stock 26 moves vertically towards the adjuster 42 which will be described in detail with reference to FIG. 4. This adjuster is used to ensure that a proper distance is maintained between the line of action of the cutting and welding mechanism 38 and a finishing station 114. The station is of conventional form and separates the bag stock into individual bags.

Reference is now made to FIGS. 3 and 4 to describe the adjuster 42, with particular reference being made to FIG. 4. A handwheel 116 is mounted on a shaft 117 which is carried in a bearing 118 for rotating about a vertical axis. The handwheel is coupled by a chain 120 to a slave wheel 112 mounted on a shaft 124 which in turn is carried by a bearing 126. The bearings 118, 126 are attached to transverse connecting member 62 of the support structure 44.

Shafts 117, 124 are threadably engaged in respective sliders 128, 130 located for vertical movement in respective guides 132 (one pair of which can be seen in FIG. 3). Sliders 128, 130 carry a roller 134 so that upon rotating handwheel 116 the slave wheel 122 duplicates the handwheel movement and the sliders 128, 130 move vertically in unison to maintain the roller 134 horizontal as its vertical position is changed.

It will be evident from FIG. 3 that the length of stock 26 between the combination cutting and welding mechanism 38 and the finishing station 114 must be controlled to ensure that the bags are severed from the stock in proper registration with the positions of the handles added to the bag stock. The adjuster 42 permits this length of bag stock to be varied to obtain such registration.

Reference is again made to FIG. 3. After leaving adjuster roller 134, the bag stock passes over a further roller 136 between the inclined members 60 and then between a pair of friction rollers 138, 140 forming part of the drive mechanism 40. These rollers form a nip which grips the bag stock for driving the bag stock through the apparatus. An actuator 142 is mounted on one of the inclined members 60 and is coupled through a rod 144 to a rack in 146 in engagement with a pinion 148. This pinion is coupled through a one-way clutch (not shown) to the roller 140 so that upon energising the actuator 142 to move the rack 146 outwardly (i.e., down the member 60), the rollers 138, 140 are made to rotate and to thereby draw the bag stock through the apparatus. The length of this outward stroke is limited by a stop 150 which is used to set the extended position of the rack 146. When the actuator 142 is withdrawn the rack returns to a withdrawn position and the clutch allows this rack movement without causing rotation of the rollers 138, 140. The distance between the extended and withdrawn positions of the rack corresponds to a movement of the bag stock 26 through one bag length.

The bag stock is advanced through the apparatus by the drive mechanism 40 intermittently with each movement corresponding to one bag length. As soon as the bag stock is stationary the conventional finishing station 114 severs a completed bag and welds the bottom of the next bag at the end of the bag stock. At the same time the combination cutting and welding mechanism 38 will be actuated to cause this mechanism to cut out openings (e.g., 22 and 24 FIG. 1) and to weld on handles (e.g., 18 and 20 FIG. 1).

Reference is now made to FIGS. 4 and 5 with particular reference to FIG. 5 to describe the combination cutting and welding mechanism 38 which includes the float piece 36. This float piece is generally rectangular with rounded edges to ensure that the bag stock moves smoothly over the piece 36. As previously described the float piece 36 is located by the rollers associated with the carrier 98 (FIG 1) and by the corresponding rollers mounted on the main uprights 54.

A pair of peripheral heating elements 152, 154 are contained in respective platens 156, 158 and separated from a carrier 160 by respective heat insulation elements 162, 164. A bolt 166 passes through the carrier 160 and carries a spring loaded contact 168 at its inner end for receiving electrical current supplied as will be described. This current is conducted through the bolt 116 and then to the elements 152, 154 by way of respective electrical conductors 170, 172 attached to an outer end of the bolt 166.

The carrier 160 is embedded in the central float piece 36 and an opening 174 is provided to give access to the bolt 166 and conductors 170, 172. A similar arrangement is provided at the opposite side of the float piece 36 so that current passes through the heating elements 152, 154 from one side of the piece 36 to the other side around parallel paths terminating at a contact 176 which is similar to contact 142. The structure associated with contact 176 is similar to that described with reference to contact 168. Consequently, when heat is created in the heating elements 152, 154 by completing the circuit to the contacts 168, 176, there is sufficient heat at the platens 156, 158 to provide for welding the handle to the bag stock from within the bag stock as will be described.

The combination cutting and welding mechanism 38 also includes parts external to the central float piece 36. A double acting heat 178 is attached by a coupling 179 to an actuator 180 mounted on the bracket 104. As better seen in FIG. 3, the head 178 includes a bridge piece 182 to which is attached upper and lower guide rods 184, 186 slidably engaged in suitable bearings 188 (one of which is seen in FIG. 5) attached to bracket 104. The guide rods 184, 186 maintain the proper alignment of the head 178 with the float piece 36.

The head 178 includes a main element 190 of an insulator material such as a phenolic resin which is coupled to the bridge piece 182 by a combination of elongated screws 192, 194 and electrical connectors 196, 198. These connectors are set in the main element 190 in alignment with respective contacts 168, 176 in the float piece 36 to make electrical connections for heating the platens 156, 158. The screws 192, 194 pass through insulated bushings 200, 202 set in the bridge piece 182, and through a rearward part of the main element 190. The screws are threaded into the respective connectors 196, 198 and respective electrical conductors 204, 206 are retained in place by the screws 192, 194 for supplying electrical power from a source (not shown).

The main element 190 is reinforced by a metal tubular element 208 which extends about the main element 190 in frictional engagement therewith and is spaced from the connectors 196, 198.

A cutter 210 is attached to a leading end of the main element 190 by suitable screws 212 and is shaped for cutting the bag stock to define openings such as openings 22, 24 shown in FIG. 1. It will therefore be evident that the cutter is not cylindrical and that consequently the main element 190, and element 208 correspond in shape with the cutter 210.

The head 178 also includes a clamping mechanism 212 which is used to press the handles 110, 112 into contact with the bag stock which is then in turn pressed against the respective platens 156, 158. The mechanism 212 includes a compression spring 214 which is located in a circular groove 216 in the bridge piece 182 at one of its ends and at its other end in a retainer 218 which is generally cylindrical at its outer extremity. This retainer fits snugly on an insulator 220 to separate the connectors 196, 198 from the retainer when the mechanism 38 is in use as will be descirbed. The retainer is held on the insulator 220 against a shoulder formed on the insulator by a pressure plate or end pieces 222 which is held on the insulator 222 by suitable screws 224.

The insulator 220 is proportioned to permit the cutter 222 and main element 190 carrying the connectors 196, 198 to pass through the insulator 222. Accordingly, it will be evident that when the actuator 180 causes the head 182 to move forwardly, the end piece 222 will engage handle 112 and push the handle axially along the line of action of the actuator 180. Consequently after a relatively small movement a compressive force is created due to engagement of handle 110 with a stop or reaction plate 226 having a clearance opening 228 to permit the cutter 222 to pass beyond the bag stock thereby ensuring that the bag stock is cut completely.

Once the head 178 has moved axially to a point where the handles 110, 112 are compressed slightly, further movement of the head results in compression of spring 214 so that the cutter 210 then continues onwardly as it slides through insulator 220 as seen in FIG.

Figure 6:
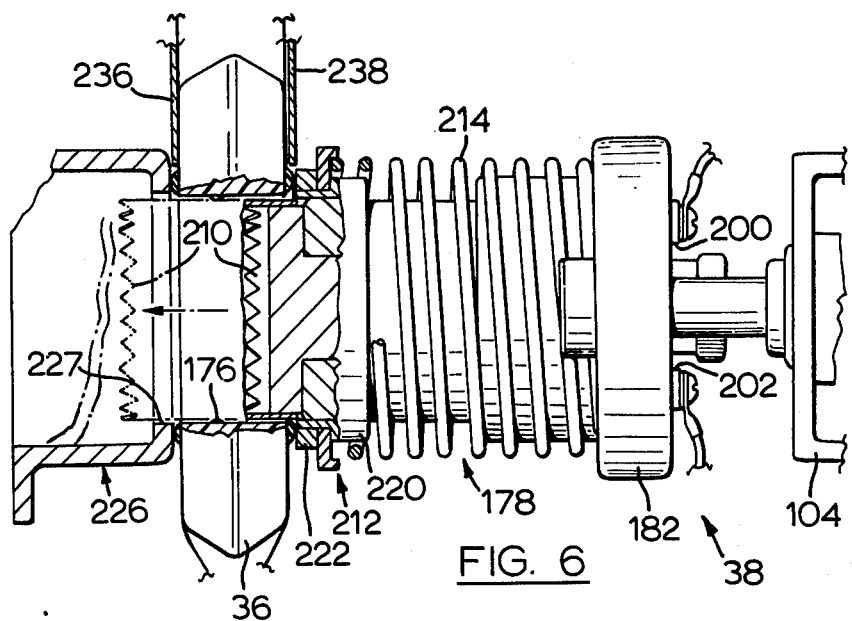
FIG. 6 is a view similar to FIG. 5 showing the mechanism in a partially extended position.

6. The cutter then passes through the bag stock inside handle 112 and carries on until it has passed through the bag stock adjacent handle 110 as shown in ghost outlines in FIG. 6. Before the forward movement of the cutter 210 has stopped, the electrical connectors 196, 198 have made engagement with the contacts 168, 176 so that electrical power is conducted to the heading elements 152, 154 to heat the platens 156, 158. It will be evident that in a continuous process there is residual heat in the platens so that it is only necessary to bring the platens up to a temperature sufficient to ensure that the handles are welded to the bag stock. The head can then be withdrawn leaving behind openings in the bag stock inside handles 110, 112 on the bag stock.

When the welding takes place the bag stock is softened by the heat in the platens and the projections 25 (FIG. 2) on the handle are caused to penetrate the softened bag stock by the application of the compression forces. Subsequently the ends of the projections flattens as they are also softened by the heat so that the projections effectively key to the bag stock. This process together with any actual welding which takes place is described as 'welding' the handles to the bag stock. As previously mentioned, this welding can be done only from inside the bag stock if the handles are to be outside the bag stock.

The double-acting head 178 has the advantage that it first clamps the bag stock in position next to the bag handles before it cuts the opening in the bag stock. This arrangement ensures relatively accurate registration of the handles relative to the openings and thereby provides a product having an improved appearance which is more acceptable to purchasers of bags of this type.

Reference is now made to FIGS. 4 and 5 to describe a transport mechanism 228 which feeds handles 110, 112 into alignment with the cutting and welding mechanism 38 while the bag stock is being transported through a bag length by the drive mechanism 40 (FIG. 3). The transport mechanism 228 is attached to one of the main uprights 54 by a bracket 230. A pair of actuators 232, 234 are attached to this bracket in parallel for operation along respective paths which intersect orthogonally with the line of action of the mechanism 38. Respective carrier plates 236, 238 are connected by couplings 240, 242 to actuators 232, 234 for transporting the handles from respective magazines 244, 246 into the positions occupied by handles 110, 112 in FIG. 5. Carrier plate 238 is typical of both plates and is shown in FIG. 4. The plate terminates at its outer end at a forwardly opening recess 248 shaped to receive a handle 250 from the magazine 246.

Returning to FIG. 5, respective actuators 235 (one of which is seen in part) more handles 237, 239 through the magazines 244, 246 along respective paths which are aligned and parallel to the line of action of mechanism 38. The present handles from the magazines engage against respective stop plates 241, 243 until the carrier plates 236, 238 move the handles into position for welding to the bag stock.

When the carrier plates 236, 238 engage handles from the respective magazines 244, 246 the actuators 232, 234 move these handles while the bag stock is moving past the float piece 26 into position about the line of action of the cutting and welding mechanism 38. The strokes of the respective actuators 232, 234 are controlled so that the carrier plates 236, 238 move suitably between withdrawn and extended positions. In the extended positions further handles 237, 239 are prevented from moving from the magazines by the carrier plates 237, 239 whereas in the withdrawn positions the handles engage in recesses in these plates ready for transport towards the line of action of mechanism 38.

Reference is again made to FIG. 3 to describe the setting up and use of the apparatus for handling the bag stock 26. Firstly, the various parts of the apparatus are set up generally as shown in FIG. 3 with the exception that the roller carrier 98 is moved into a withdrawn position by energising actuators 102 to rotate the carrier 98 outwardly about pivots 100. This is to provide access between the sets of rollers used to locate the float piece 36. Next, a supply roll 28 of bag stock 26 is placed in position and bag stock is fed by hand around rollers 30, 32 and dancer roller 34. The bag stock is then brought upwardly and the float piece 36 is entered into the bag stock. Next, the bag stock is drawn past the float piece to a point above the roller carrier 98 and then, when holding the end of the bag stock above the carrier 98, the actuators 102 are energised to rotate the carrier 98 back into position. At this time care is taken to ensure that the float piece 36 is in proper location to permit the carrier 98 to return to the position shown in FIG. 3. The leading end of the bag stock is then fed first around roller 134 of the adjuster 42 and then over the further roller 136 before being passed through the nip between friction rollers 138, 140. Next, the transport mechanism 228 (FIG. 5) is actuated to move the handles 110, 112 into position for welding onto the bag stock.

The mechanism 38 now cuts the bag stock and welds a pair of handles to the bag stock as previously described. This mechanism is then withdrawn and the carrier plates 236, 238 of the transport mechanism 228 are also withdrawn. The bag stock is then moved through a bag length by the intermittent drive mechanism 40 while the transport mechanism 228 supplies a further pair of handles ready for attachment to the bag stock. The apparatus is now allowed to operate continuously until the first pair of handles reaches the finishing station 114. At this point the position of the first finished bag must be located relative to the finishing station so that this bag is severed at the correct position on the bag stock. The adjustment is made with the apparatus stationary by using the adjustor 42. Once the adjustment has been made the apparatus can then run substantially continuously until the supply roll 28 is exhausted. The position of the bag stock relative to the finishing station 114 will be examined periodically and any necessary small adjustment can be made by turning the handwheel 116 of the adjustor 42.

Although in the preferred embodiment the float piece 36 is restrained by rollers 82 and 84, 90 and 92, 94 and 96, and 86, 88, suitable materials can be chosen to eliminate the need for these rollers. For instance, highly polished metal shoes which allow the bag stock to slide over them can be used in place of the rollers. In general, these rollers are characteristic of any suitable restraining means which permits the bag stock to be drawn over the float piece while at the same time containing the float piece to locate those parts of the cutting and welding mechanism 38 which are within the float piece in alignment with the moving parts of the mechanism.

The form of the bag 10 (FIG. 1) is exemplary of many types of bags which can be fed through the apparatus as bag stock. The apparatus is not limited to one size of bag because the size of the apparatus can be adjusted or changed to accommodate many sizes of bag stock.

It will also be appreciated that the combination cutting and welding mechanism 38 can take many forms. For instance, the clamping mechanism 212 could be actuated axially at one side of the float piece 36 and the cutter could then operate axially from the other side of the float piece ending with the cutter inside the clamping mechanism. Such an arrangement is within the scope of the present invention.

Figure 7:
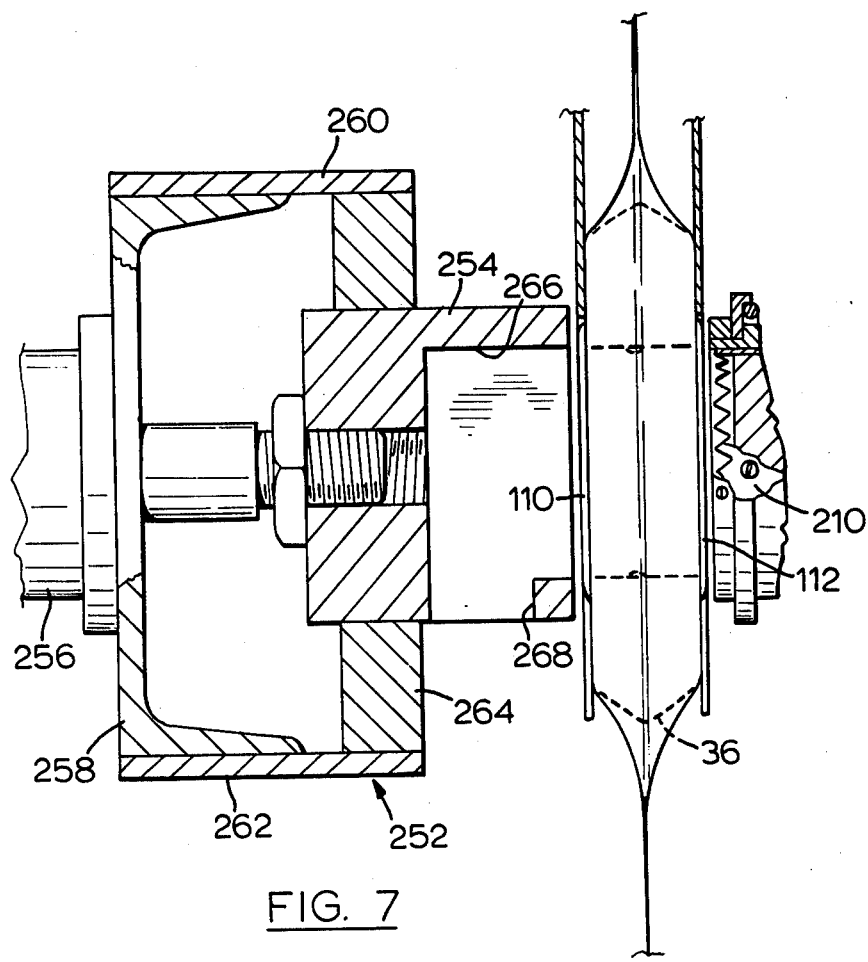
FIG. 7 is a view similar to part of FIG. 5 showing an alternative embodiment.

As seen in FIG. 5 stop 226 is fixed and consequently a reaction will be created at this stop only after the actuator 180 has caused the pressure plate 222 to move the float piece 36 axially relative to the actuator 180 to bring the bag stock into engagement with the stop 226. Consequently the guide rollers on the roller carrier 98 must be positioned relative to the stop 26 to allow this movement of the float piece 36. An embodiment requiring less critical tolerances is shown in FIG. 7. In this embodiment a stop 252 includes a movable end piece 254 attached to an end of an actuator 256 mounted on a structural element 258. Upper and lower elements 260, 262 are attached to the element 258 and terminate at a guide 264 which slidably locates the end piece 254. The actuator 256 is energised at the same time as actuator 180 (FIG. 5) so that the end piece 254 moves into engagement with the bag stock to ensure adequate forces are developed to apply pressure to the handles independent of movement of the float piece.

The end piece 254 has an opening 266 for receiving the cutter 210 snugly and a downwardly opening slot 268 through which portions of the bag stock cut from this stock can fall. Suction can be applied to the slot 268 to remove these portions if preferred.

We claim:

1. Apparatus for applying plastic handles to tubular plastic bag stock, the apparatus comprising:
    a drive mechanism adapted to feed the bag stock through the apparatus intermittently in discrete lengths, each one of said lengths corresponding to the length of a bag;
    a combination cutting and welding mechanism including a float piece having parallel front and rear sides and adapted to be positioned inside the bag stock, and a double-acting head movable axially along a predetermined line of action;
    means restraining the float piece in position with said sides at right angles to the line of action, the float piece remaining in a predetermined position as the bag stock is fed over said sides of the float piece by the drive mechanism, parts of the bag stock adjacent to and not in contact with one of said sides of the float piece being free to lie in face-to-face engagement with corresponding parts of the bag stock adjacent to and not in contact with the other of said sides of the float piece;
    a handle transport mechanism adapted to feed pairs of handles to respective positions one at each of said sides of the float piece immediately adjacent respective outer sides of the bag stock with the handles disposed similarly about said line of action and in respective planes which are generally parallel to said sides of the float piece;
    said combination cutting and welding mechanism being operable along said line of action when the bag stock is stationary, and further comprising: guide means coupled to the head to restrain the head to move axially along said line of action; actuator means coupled to the head for moving the head axially; heating elements coupled to the float piece; electrical contacts coupled electrically to the heating elements; a pair of platens in thermal engagement with the heating elements and having respective shapes corresponding to the shapes of said handles, the platens being located about said line of action so that upon heating the platens and energising said actuator to apply forces to press the sides of the bag stock between respective handles and platens, the respective bag stock sides and handles are welded to one another;
    said double-acting head comprising: a cutter corresponding in shape to openings required in the bag sides inside the handles; an end piece slidably mounted for axial movement relative to the cutter; means adapted to bias the end piece outwardly relative to the cutter; and electrical connectors aligned axially with said electrical contacts;
    a back stop aligned with the end piece to provide reactive forces;
    said actuator means being operable to move the double-acting head between a withdrawn position in which the head is clear of the bag stock and handles, and an extended position in which the cutter projects through both sides of the bag stock and the end piece and back stop apply compressive forces which hold the handles in contact with the bag sides so that the bag sides are then in thermal engagement with the platens to thereby weld the bag sides to the handles, the electrical connectors then being in engagement with the respective contacts to complete an electrical circuit for heating the platens.

2. Apparatus as claimed in claim 1 and further comprising: a finishing station adapted to both cut the bag stock into bag lengths as the bag stock leaves the drive mechanism and to weld a bottom of a bag; and an adjuster adapted to change the length of bag stock between said line of action of the combined cutting and welding mechanism and the finishing station to ensure proper registration of the finishing station relative to the handles applied to the bag stock.

3. Apparatus as claimed in claim 1 in which the handle transport mechanism comprises: a pair of aligned magazines adapted to contain a plurality of the handles in face-to-face arrangement; a pair of carrier plates in parallel arrangement for movement transversely of said line of action, each carrier plate being adapted to carry one handle from a withdrawn position in which this carrier plate receives a handle from a corresponding one of the magazines and an extended position in which this handle is in one of said respective positions at a side of the float piece; and means adapted to move the carrier plates between said withdrawn and extended positions.

4. In apparatus for applying plastic handles to plastic bag stock, the improvement wherein the apparatus includes a combination cutting and welding mechanism comprising: a float piece having parallel sides and adapted to be positioned inside the bag stock; a double acting head movable axially along a predetermined line of action perpendicular to said sides of the float piece; guide means coupled to the head to restrain the head to move axially; actuator means coupled to the head for moving the head axially; heating elements coupled to the float piece; electrical contacts coupled electrically to the heating elements; a pair of platens in thermal engagement with the heating elements and having respective shapes corresponding to the shapes of said handles, the platens being located about said line of action so that upon heating the platens and energising said actuator to apply forces to press the sides of the bag stock between respective handles and platens, the respective bag stock sides and handles are welded to one another; said double-acting head comprising: a cutter corresponding in shape to openings required in the bag sides inside the handles; an end piece slidably mounted for axial movement relative to the cutter; means adapted to bias the end piece axially relative to the cutter; electrical connectors aligned axially with said electrical contacts; and a back stop aligned with the end piece to provide reactive forces;

said actuator means being operable to move the double-acting head between a withdrawn position in which the head is clear of the bag stock and handles, and an extended position in which the cutter projects through both sides of the bag stock and the end piece and back stop apply compressive forces which hold the handles in contact with the bag sides so that the bag sides are then in thermal engagement with the platens to thereby weld the bag sides to the handles, the electrical connectors then being in engagement with the respective contacts to complete an electrical circuit for heating the platens;

and in which the apparatus further includes means restraining the float piece in position with said sides at right angles to the line of action, the bag stock adjacent to and not in contact with one of said sides of the float piece being free to lie in face-to-face engagement with corresponding parts of the bag stock adjacent to and not in contact with the other of said sides of the float piece.

5. Apparatus for applying plastic handles to tubular plastic bag stock, the apparatus comprising:

a drive mechanism adapted to feed the bag stock through the apparatus intermittently in discrete lengths, each one of said lengths corresponding to the length of a bag;

a float piece having parallel sides and adapted to be positioned inside the bag stock;

means restraining the float piece to remain in a predetermined position as the bag stock is fed over the float piece by the drive mechanism such that parts of the bag stock adjacent to and not in contact with one of said sides of the float piece is free to lie in face-to-face engagement with corresponding parts of the bag stock adjacent to and not in contact with the other of said sides of the float piece;

a handle transport mechanism adapted to feed pairs of handles to respective positions one at either side of the float piece immediately adjacaent respective outer sies of the bag stock, the handles then being disposed similarly about an axis perpendicular to the float piece;

a clamping mechanism adapted to move axially along said axis to apply a compressive force whereby the bag stock is clamped between respective handles and the float piece;

a cutter movable along said axis to form openings in the bag stock inside said handles;

actuator means adapted to move said clamping mechanism and said cutter assembly in sequence to first create said compressive force and then to cut the bag stock;

the float piece including heating elements; electrical contacts coupled electrically to the heating elements; a pair of platens in thermal engagement with the heating elements and having respective shapes corresponding to the shapes of said handles, the platens being located about said axis so that upon heating the platens and energising said actuator means to apply forces to press the sides of the bag stock between respective handles and platens, the respective bag stock sides and handles are welded to one another; and electrical connectors coupled to the cutter and aligned axially with said electrical contacts so that when the cutter is moved to cut the bag stock the electrical connectors are in engagement with the respective contacts to complete an electrical circuit for heating the platens.

6. Apparatus as claimed in claim 5 and further comprising: a finishing station adapted to both cut the bag stock into bag lengths as the bag stock leaves the drive mechanism and to weld a bottom of a bag; and an adjuster adapted to change the length of the bag stock between said axis and the finishing station to ensure proper registration of the finishing station relative to the handles applied to the bag stock.

7. Apparatus as claimed in claim 5 in which the handle transport mechanism comprises: a pair of aligned magazines adapted to contain a plurality of the handles in face-to-face arrangement; a pair of carrier plates in parallel arrangement for movement transversely of said axis, each carrier plate being adapted to carry one handle from a withdrawn position in which this carrier plate receives a handle from a corresponding one of the magazines and an extended position in which this handle is in one of said respective positions at a side of the float piece; and means adapted to move the carrier plates between said withdrawn and extended positions.

8. In apparatus for applying plastic handles to plastic bag stock, the improvement wherein the apparatus comprises:

a float piece adapted to be positioned inside the bag stock and having parallel sides;

a clamping mechanism adapted to move axially along said axis to apply a compressive force whereby the bag stock is clamped between respective handles and the float piece;

a cutter movable along said axis to form openings in the bag stock inside said handles;

actuator means adapted to move said clamping mechanism and said cutter axially in sequence to first create said compressive force and then to cut the bag stock;

means restraining the float piece in position with said sides at right angles to said axis such that the float piece remains in a predetermined postion as the bag stock is fed over said sides of the float piece, and such that parts of the bag stock adjacent to and not in contact with one of said sides of the float piece is free to lie in face-to-face engagement with corresponding parts of the bag stock adjacent to and not in contact with the other of said sides of said sides of the float piece;

the float piece including heating element; electrical contacts coupled electrically to the heating elements; a pair of platens in thermal engagement with the heating elements and having respective platens being located about said axis so that upon heating the platens and energising said actuator means to apply forces to press the sides of the bag stock between respective handles and platens, the respective bag stock sides and handles are welded to one another; and electrical connectors coupled to the cutter and aligned axially with said electrical contacts so that when the cutter is moved to cut the bag stock the electrical connectors are in engagement with the respective contacts to complete an electrical circuit for heating the platens.

9. Apparatus as claimed in claim 1 in which the back stop comprises a movable end piece for movement axially in alignment with said line of action and means adapted to move the end piece towards the combination cutting and welding mechanism when the head is moved towards the float piece to thereby apply said compressive forces.

10. Apparatus as claimed in claim 4 in which the back stop comprises a movable end piece for movement axially in alignment with said line of action and means adapted to move the end piece towards the combination cutting and welding mechanism when the head is moved towards the float piece to thereby apply said compressive forces.

* * * * *